(12) United States Patent
Fujinawa

(10) Patent No.: US 6,323,967 B1
(45) Date of Patent: Nov. 27, 2001

(54) ILLUMINATION DEVICE AND IMAGE READING APPARATUS

(75) Inventor: Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/079,270

(22) Filed: May 15, 1998

(30) Foreign Application Priority Data

May 16, 1997 (JP) .................................................. 9-127268

(51) Int. Cl.⁷ .................................................. H04N 1/04
(52) U.S. Cl. .................................... 358/484; 358/475
(58) Field of Search .................................. 358/474, 475, 358/484, 471; 250/336.1, 363.02, 370.08; 351/221, 220

(56) References Cited

U.S. PATENT DOCUMENTS

| 4,680,638 | 7/1987 | Childs | 358/214 |
|---|---|---|---|
| 4,917,486 | * 4/1990 | Raven | 351/221 |
| 5,036,405 | 7/1991 | Kojima | 358/448 |
| 5,266,805 | 11/1993 | Edgar | 250/330 |
| 5,537,229 | 7/1996 | Brandestini et al. | 358/509 |
| 5,668,919 | * 9/1997 | Ito | 396/268 |
| 5,779,058 | * 7/1998 | Satake et al. | 209/581 |
| 6,002,792 | * 12/1999 | Oguri et al. | 382/145 |
| 6,018,630 | * 1/2000 | Arai | 396/51 |
| 6,094,302 | * 7/2000 | Bergstedt | 359/403 |

FOREIGN PATENT DOCUMENTS

| 58-68651 | 4/1983 | (JP) . | |
|---|---|---|---|
| 62-188951 | 8/1987 | (JP) . | |
| 62-188952 | 8/1987 | (JP) . | |
| 62-203460 | 9/1987 | (JP) . | |
| 62-203469 | 9/1987 | (JP) . | |
| 62-203477 | 9/1987 | (JP) . | |
| 7-212792 | 8/1995 | (JP) . | |
| 411264935A | * 9/1999 | (JP) | G02B/21/06 |
| 62110339 | * 5/1987 | (JP) | H04B/9/00 |
| 410322519A | * 12/1998 | (JP) | H04N/1/04 |

* cited by examiner

Primary Examiner—Jerome Grant, II

(57) ABSTRACT

A device has a visible light emitting element for emitting visible light, an infrared light emitting element for emitting infrared light, a board including a first mounting portion on which elements including at least the visible light emitting element are mounted in array and a second mounting portion on which elements including at least the infrared light emitting element are mounted in array, and a dichroic mirror which is configured and disposed to reflect light emitted by the visible light emitting element mounted on the first mounting portion by its first surface, reflect light emitted by the infrared light emitting element mounted on the second mounting portion by its second surface, and send light beams coming from the first and second surfaces onto a common optical path.

21 Claims, 7 Drawing Sheets

ILLUMINATION DEVICE AND IMAGE READING APPARATUS

The entire disclosure of Japanese Patent Application No. 9-127268 including specification, claim, drawings and summary is incorporated herein by reference in its entirety.

BACKGROUND OF THE INVENTION

1. Field of the Invention

The present invention relates to an illumination device for illuminating an original, and an image reading apparatus using the device as illumination means.

2. Related Background Art

An image reading apparatus comprises illumination means for illuminating a film original such as a negative film, reversal film, elongated film, or the like, convey means for conveying the film original, image reading means for reading an image on the film original by receiving light transmitted through the film original, and outputting an image signal, and image processing means for performing arithmetic processing of data of the image read by the image reading means. The image reading apparatus is used for capturing an image on a film original into a so-called personal computer or the like.

A color image is normally read by switching three colors, i.e., red (R), green (R), and blue (B). When small dust particles, scratches, and the like are present on the film original, they appear as black dots (in case of a positive film) or white dots (in case of a negative film) on the read image, thus deteriorating the image quality.

In order to solve such problem, a technique for detecting dust, scratches, and the like on a film original using the feature of infrared rays has been proposed (for example, Japanese Patent Laid-Open Application No. 63-116551). In this case, the image reading apparatus must be capable of reading using infrared rays (IR) in addition to normal reading using three colors, i.e., red (R), green (R), and blue (B).

More specifically, the image reading apparatus which can read using infrared rays (IR) must have light sources that output four color light beams, i.e., red (R), green (R), blue (B), and infrared (IR) light beams.

As is well known, the image reading apparatus must meet compact and low-cost requirements. Even when the apparatus is designed to read using infrared rays (IR), it must be capable of normal reading using three colors.

Hence, an illumination device that can output four color light beams must solve a problem that pertains to the positional relationship upon aligning the beam positions of light beams output from four color light sources in association with a size reduction, in addition to realization of a compact and low-cost arrangement.

SUMMARY OF THE INVENTION

It is an object of the present invention to provide an illumination device which can output visible light and infrared light, and an image reading apparatus using the device as illumination means.

An illumination device according to the present invention comprises a visible light emitting element for emitting visible light, an infrared light emitting element for emitting infrared light, a board including a first mounting portion on which elements including at least the visible light emitting element are mounted in array and a second mounting portion on which elements including at least the infrared light emitting element are mounted in array, and a dichroic mirror which is configured and disposed to reflect light emitted by the visible light emitting element mounted on the first mounting portion by a first surface thereof, reflect light emitted by the infrared light emitting element mounted on the second mounting portion by a second surface thereof, and send light beams coming from the first and second surfaces onto a common optical path.

As described above, the first mounting portion on which elements including at least the visible light emitting element are mounted in array and the second mounting portion on which elements including at least the infrared light emitting element are mounted in array are formed on the board, and light emitted by the visible light emitting element mounted on the first mounting portion and light emitted by the infrared light emitting element mounted on the second mounting portion are adjusted and output by the dichroic mirror to propagate along a common optical path. Hence, from the viewpoint of the dichroic mirror on the optical axis, the light beams output from the visible and infrared light emitting elements appear to come from an identical location. In addition, since the visible and infrared light emitting elements are mounted in array, the illumination device can be rendered compact.

In this illumination device, the dichroic mirror may be formed so that the first surface transmits the infrared light therethrough. Also, the dichroic mirror may be formed so that the second surface transmits the visible light therethrough. The visible light emitting element may be at least one of red, green, and blue light emitting elements.

The above illumination device preferably further comprises a diffusion plate disposed in the common optical path to diffuse the visible light, since illumination nonuniformity can be improved.

In the illumination device of the present invention, it is effective to mount a light emitting element, an amount of light of which must be increased, on one of the first and second mounting portions that is closer to a light exit side of the first and second mounting portions in consideration of reflection losses in the dichroic mirror.

In the illumination device of the present invention, when the visible light emitting element comprises three different elements, i.e., red, green, and blue light emitting elements, the layout of these light emitting elements can be flexibly designed in correspondence with the characteristics of the respective elements. More specifically, layouts in the following examples are available.

For example, the light emitting element mounted on one of the first and second mounting portions that is closer to a light exit side than the other includes the infrared and red light emitting elements, and the light emitting element mounted on the mounting portion farther from the light exit side includes the blue and green light emitting elements. In another example, the light emitting element mounted on one of the first and second mounting portions that is closer to a light exit side includes the infrared and blue light emitting elements, and the light emitting element mounted on the mounting portion farther from the light exit side includes the red and green light emitting elements. In still another example, the light emitting element mounted on one of the first and second mounting portions that is closer to a light exit side includes the infrared light emitting element, and the light emitting element mounted on the mounting portion farther from the light exit side includes the red, blue, and green light emitting elements. In yet another example, the light emitting element mounted on one of the first and second mounting portions that is closer to a light exit side includes the infrared, red, and green light emitting elements, and the light emitting element mounted on the mounting portion farther from the light exit side includes the blue light emitting element.

As a preferred example, when the infrared light emitting element used in illumination for detecting, e.g., a scratch on an original is mounted on the inner side of the array on the first mounting portion, and the green light emitting element that emits green light which is a color the human eye can recognize best of the visible light emitting elements including three different elements, i.e., red, green, and blue light emitting elements, is mounted on the inner side of the array on the second mounting portion, infrared light and green light can illuminate to have nearly the same distributions. Hence, a color to which the human eye is most sensitive can be corrected more accurately. Also, when the infrared light emitting element used in illumination for detecting, e.g., a scratch on an original is mounted on the outer side of the array on the first mounting portion, and the green light emitting element that emits green light to which the human eye is most sensitive of the visible light emitting elements including three different elements, i.e., red, green, and blue light emitting elements, is mounted on the outer side of the array on the second mounting portion, infrared light and green light can illuminate to have nearly the same distributions. Therefore, a color to which the human eye is most sensitive can be corrected more accurately.

In the illumination device of the present invention, a rod-like optical member for converting light entering from one end thereof into linear output light is preferably disposed in the common optical path, since an illumination device can have a simple arrangement, and a compact linear illumination device can be realized. In addition, since diffuse illumination is made, illumination nonuniformity can be eliminated.

Also, when the illumination device comprises a rod-like optical member for converting light entering from one end thereof into linear output light, a light emitting lamp disposed at one end of the rod-like optical member to selectively emit first visible light and second visible light, and an infrared light emitting lamp disposed at the other end of the rod-like optical member to emit infrared light, a compact linear illumination device can be realized. Furthermore, since diffuse illumination is made, illumination nonuniformity can be eliminated.

The present invention is further directed to an image reading apparatus.

An image reading apparatus according to one mode of the present invention comprises an illumination device for illuminating an original, a convey device for conveying the original, an image reading device for reading an image on the original upon receiving light transmitted through the original, and outputting an image signal, and an image processing device for arithmetically processing data of the image read by the image reading device. In this apparatus, the illumination device comprises a visible light emitting element for emitting visible light, an infrared light emitting element for emitting infrared light, a board including a first mounting portion on which elements including at least the visible light emitting element are mounted in array and a second mounting portion on which elements including at least the infrared light emitting element are mounted in array, a dichroic mirror which is configured and disposed to reflect light emitted by the visible light emitting element mounted on the first mounting portion by a first surface thereof, reflect light emitted by the infrared light emitting element mounted on the second mounting portion by a second surface thereof, and send light beams coming from the first and second surfaces onto a common optical path, and a diffusion plate disposed in the common optical path to diffuse light leaving the dichroic mirror.

In this image reading apparatus, the dichroic mirror adjusts and outputs light beams emitted by the visible and infrared light emitting elements mounted in array on the board in the illumination device so that they propagate along a common optical path, and the diffusion plate diffuses and radiates these light beams, thus illuminating an original. Hence, when the illumination device illuminates a film, since outgoing light beams from the visible and infrared light emitting elements are output toward a nearly equal location on the original, illumination nonuniformity can be eliminated.

An image reading apparatus according to another mode of the present invention comprises an illumination device for illuminating an original, a convey device for conveying the original, an image reading device for reading an image on the original upon receiving light transmitted through the original, and outputting an image signal, and an image processing device for arithmetically processing data of the image read by the image reading device. In this apparatus, the illumination device comprises a visible light emitting element for emitting visible light, an infrared light emitting element for emitting infrared light, a board including a first mounting portion on which elements including at least the visible light emitting element are mounted in array and a second mounting portion on which elements including at least the infrared light emitting element are mounted in array, a dichroic mirror which is configured and disposed to reflect light emitted by the visible light emitting element mounted on the first mounting portion by a first surface thereof, reflect light emitted by the infrared light emitting element mounted on the second mounting portion by a second surface thereof, and send light beams coming from the first and second surfaces onto a common optical path, and a rod-like optical member disposed in the common optical path to convert light leaving the dichroic mirror and entering from one end thereof into linear output light.

In this image reading apparatus, the dichroic mirror adjusts and outputs light beams emitted by the visible and infrared light emitting elements mounted in array on the board in the illumination device so that they propagate along a common optical path, and the diffusion plate diffuses and radiates these light beams, thus illuminating an original. Hence, when the illumination device illuminates a film, since outgoing light beams from the visible and infrared light emitting elements are output toward a nearly equal location on the original, illumination nonuniformity can be eliminated.

An image reading apparatus according to still another mode of the present invention comprises an illumination device for illuminating an original, a convey device for conveying the original, an image reading device for reading an image on the original upon receiving light transmitted through the original, and outputting an image signal, and an image processing device for arithmetically processing data of the image read by the image reading device. In this apparatus, the illumination device comprises a rod-like optical member for converting light entering from an end portion thereof into linear output light, a light emitting lamp for selectively outputting first visible light and second visible light to one end of the rod-like optical member, and an infrared light emitting lamp for outputting infrared light to the other end of the rod-like optical member.

In this image reading apparatus, the rod-like optical member in the illumination device converts the first and second visible light beams selectively output from a light emitting lamp and incoming from its one end, and infrared light output from the infrared light emitting lamp and incoming from the other end into linear output light, thus illuminating an original. When the illumination device illuminates a film, the visible light and infrared light can be output toward an identical location on the original since their illumination nonuniformity is eliminated. Hence, image processing can be implemented more appropriately.

In the image reading apparatus of each mode, the image processing device may comprise a detection device for detecting foreign matter present on the original from data read using the infrared light. In this case, the image processing device may further comprise an alarm generation device for outputting an alarm signal upon detection of the presence of foreign matter on the original.

In this image reading apparatus, the image processing device preferably further comprises a correction device for, when the presence of foreign matter on the original is detected, correcting data at a position of foreign matter using visible light data near the position upon arithmetically processing data read using the visible light.

DETAILED DESCRIPTION OF THE PREFERRED EMBODIMENTS

The embodiment of the present invention will be explained below with reference to the accompanying drawings.

Figure 1:
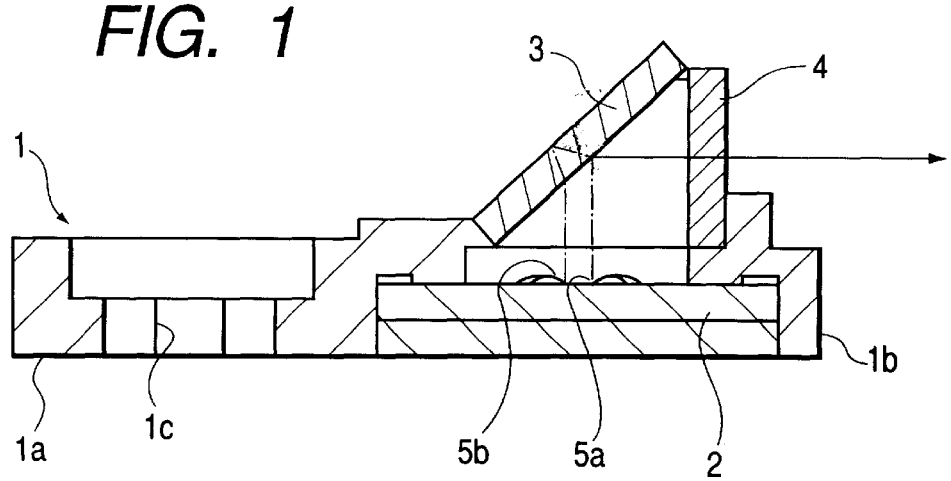
FIG. 1 is a side view of an illumination device according to an embodiment of the present invention.
Figure 2:
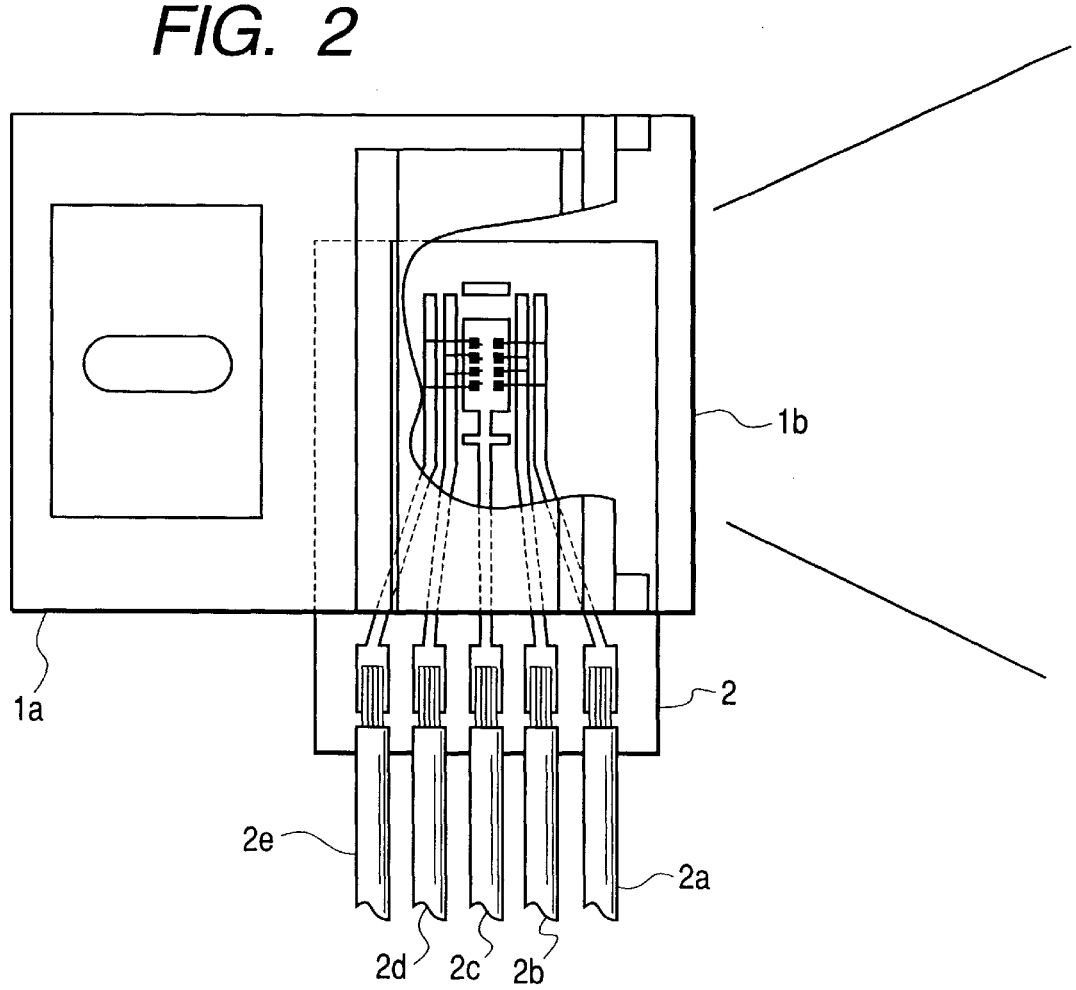
FIG. 2 is a partially cutaway, enlarged plan view showing the layout state of LED chips according to the embodiment of the present invention.

FIG. 1 is a side view of an illumination device according to an embodiment of the present invention. In FIG. 1, an attachment base 1 comprises an attachment portion 1a and a light source forming portion 1b contiguous with one side of the attachment portion 1a. A screw hole 1c is formed in the attachment portion 1a, which is fixed to a support portion (not shown) by a screw. A board 2, dichroic mirror 3, and diffusion plate 4 that constitute the illumination device are disposed on the light source forming portion 1b. Light emitting element chips (to be referred to as "LED chips" hereinafter) 5a and 5b each consisting of a plurality of light emitting diodes for generating four color light beams, i.e., red (R), green (G), blue (B), and infrared (IR) light beams, are mounted in array on the board 2, as shown in FIG. 2. In this embodiment, all the three color elements, i.e., red (R), green (G), and blue (B) elements, are equipped as visible light emitting elements, but at least one of these elements need only be arranged.

The illumination device of this embodiment will be described in detail below with reference to FIGS. 2 to 4.

FIG. 2 shows the layout state of the LED chip according to the embodiment of the present invention. The board 2 is an aluminum substrate, on which an insulating layer is coated, and two different copper foil patterns are formed. Each pattern is defined by a central broad pattern and two each thin patterns formed on two sides of the central pattern, and one-end portions of these patterns are connected to terminals (2a to 2e) formed on one end of the board 2. In FIG. 2, the right-and-left direction agrees with the optical axis direction, and the patterns are elongated in a direction perpendicular to the optical axis. Note that each pattern is gold-plated.

In the illustrated example, eight LED chips indicated by full rectangles are mounted on the central broad pattern to form two arrays (each including four chips) in a direction perpendicular to the optical axis, while their electrodes on one side are die-bonded. The electrodes on the other side of the eight LED chips are wire-bonded to two each thin patterns on two sides of the central board pattern. In the example shown in FIG. 2, since emitted light rays are output to the right in FIG. 2, the right array in FIG. 2 is a front array, and the left array in FIG. 2 is a rear array. More specifically, in FIG. 1, the LED chip 5a is one of the four LED chips in the front array, and the LED chip 5b is one of the four LED chips in the rear array.

Referring back to FIG. 2, in the right LED chip array in FIG. 2, two LED chips at the two ends in the up-and-down direction in FIG. 2 are red LED chips. These chips are connected to the thin pattern connected to the terminal 2a. The two central LED chips in the right array are infrared LED chips. These chips are connected to the thin pattern connected to the terminal 2b. In the left array in FIG. 2, the two LED chips at the two ends are blue LED chips. These chips are connected to the thin pattern connected to the terminal 2e. Also, the two central chips in the left array are green LED chips. These chips are connected to the thin pattern connected to the terminal 2d. The terminal 2c are connected to the central board pattern. That is, the terminal 2c serves as a common terminal.

The reason why the LED chips are mounted in two arrays is that when two each, four color LED chips are used, and are mounted in one array, the array becomes long in the widthwise direction perpendicular to the optical axis, and some LED chips have large distances from the optical axis. When an LED chip has a large distance from the optical axis, problems such as a decrease in amount of light that can reach a line sensor, illumination nonuniformity, and the like are posed. In this embodiment, however, a plurality of LED chips for the four colors are mounted in two arrays to avoid the above-mentioned problems, and the optical paths of the output beams from the LED chips in two arrays are matched by the dichroic mirror 3.

In the above-mentioned embodiment, the red LED chips are mounted on the inner positions of the right array in FIG. 2, and the green LED chips on the inner positions of the left array. Instead, the red LED chips may be mounted on the outer positions of the right array, and the green LED chips on the outer positions of the left array.

Infrared light is used in illumination for detecting scratches or the like on a film. On the other hand, green is a color that the human eye can recognize best. More specifically, when the red and green LED chips are disposed at nearly the same positions in the array direction, infrared light and green light can illuminate to have roughly equal distributions. For this reason, the color to which the human eye is most sensitive can be corrected more accurately.

In FIG. 1, the dichroic mirror 3 is obliquely disposed so that its mirror surface makes 45° with the surface of the board 2, and the light rays coming from the LED chips in the two arrays are incident at an incident angle of approximately 45°. In this embodiment, the front mirror surface of the dichroic mirror 3 has a filter having wavelength selectivity, and the rear mirror surface comprises a total reflection mirror.

Figure 3:
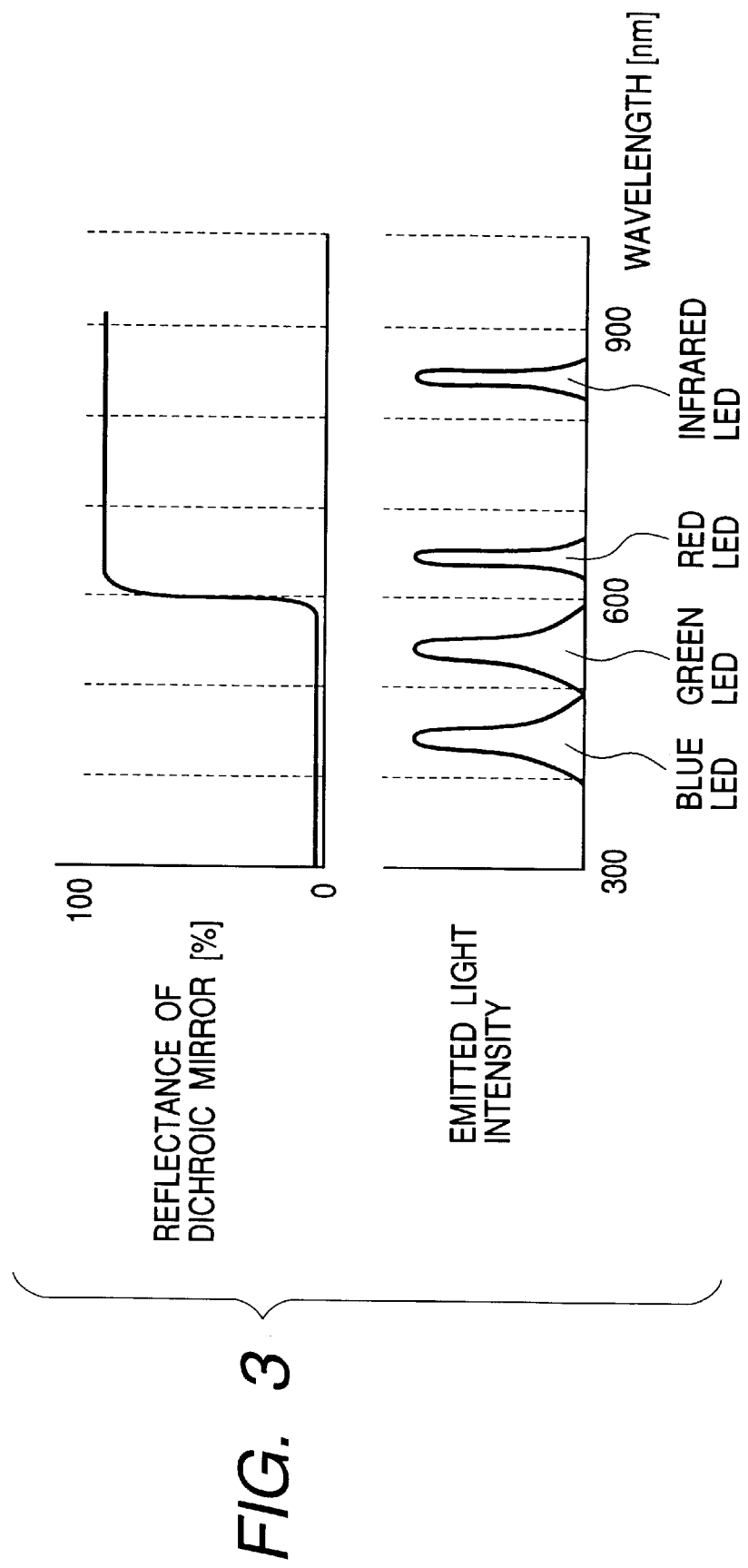
FIG. 3 is a graph showing the relationship between the spectral characteristics of a dichroic mirror and the colors of light beams emitted by four different LEDs used in the embodiment of the present invention.

FIG. 3 is a graph showing the relationship between the spectral characteristics of the dichroic mirror 3 used in this embodiment, and the colors of light emitted by the four different LED chips. As shown in FIG. 3, the wavelengths of the colors of light emitted by the LED chips become longer in the order of blue, green, red, and infrared. In this embodiment, the spectral characteristics of the front mirror surface of the dichroic mirror 3 are set to totally reflect red and infrared light beams, and to transmit blue and green light beams therethrough.

Hence, light rays coming from the green and blue LED chips in the front array are totally reflected by the front mirror surface of the dichroic mirror 3 to have their optical path bent nearly 90°, and are then externally output. On the other hand, light rays coming from the infrared and red LED chips in the rear array are transmitted through the front mirror surface of the dichroic mirror 3, and reach the rear mirror surface. These light rays are totally reflected by the rear mirror surface to have their optical path bent nearly 90°, and are then externally output via the front mirror surface. At this time, the light rays reflected by the front mirror surface of the dichroic mirror 3, and the light rays reflected by the rear mirror surface need to be output from the front mirror surface onto an identical optical axis.

Figure 4:
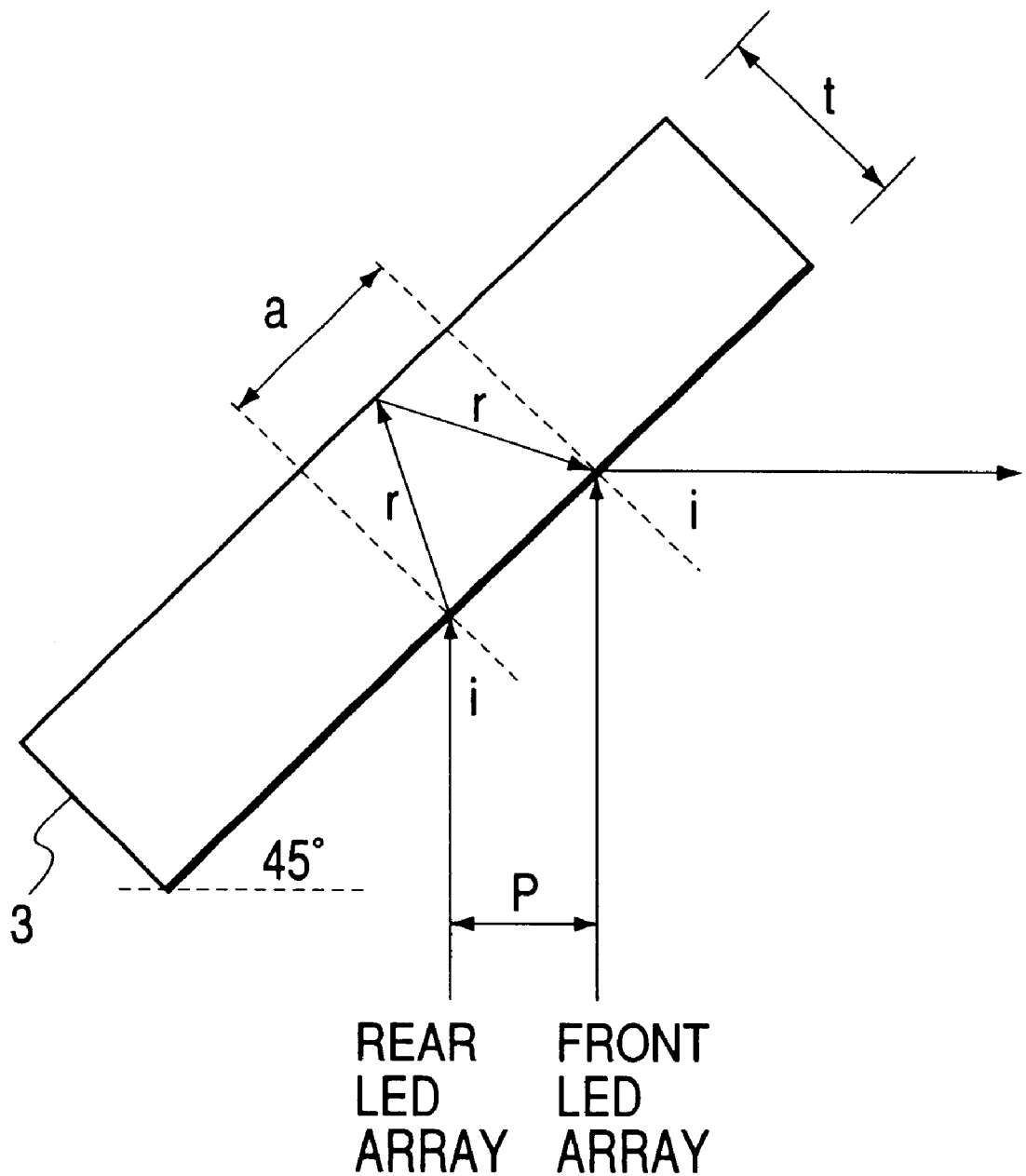
FIG. 4 shows the relationship between the dichroic mirror and the array pitch.

In order to realize such arrangement, a pitch P between the LED chip arrays can be calculated in a procedure shown in FIG. 4 on the basis of a thickness t and set angle (45°) of the dichroic mirror 3, and the refractive index of plate glass that forms the dichroic mirror 3, so that the light rays reflected by the front mirror surface of the dichroic mirror 3, and the light rays reflected by the rear mirror surface thereof are output onto an identical optical axis.

FIG. 4 shows the relationship between the dichroic mirror and array pitch. For example, if the thickness t=1.35 and the refractive index n=1.519 of the plate glass are selected, and i and γ respectively represent the incident angle and refraction angle, the refraction angle γ is given by equation (1) below from the rule of refraction, i.e., sin(i)/sin(γ) =n (glass)/n (air), and from i=45°, n (glass)=1.519, and n (air)=1:

$$\gamma = \sin^{-1}(\sin 45°/\sin 1.519) = 27.7431 \quad (1)$$

Since a spacing a between the incident and exit positions along the front mirror surface is:

$$a = 2 \times t \times \tan(\gamma) \quad (2)$$
$$= 2 \times 1.35 \times \tan(27.7431)$$
$$= 1.4203$$

the array pitch P on the board 2 becomes:

$$P = a \times \cos 45° = 1.004 \quad (3)$$

In this way, since the dichroic mirror 3 can adjust the exit positions of light rays coming from the two LED chip arrays, and can output them onto an identical optical axis, if the dichroic mirror 3 is observed externally, a plurality of color light rays appear to originate from an identical position. When voltages are selectively applied to the respective terminals, four color light beams can be selectively emitted. The diffusion plate 4 diffuse and emit four color light rays which are adjusted by the dichroic mirror 3 on the identical optical axis. With this arrangement, illumination nonuniformity can be relaxed.

In this embodiment, the infrared and red light emitting elements are mounted in the front array, and the blue and green light emitting elements are mounted in the rear array, but the array positions of these elements may be replaced. Alternatively, the infrared and blue light emitting elements may be mounted in the front array, and the red and green light emitting elements may be mounted in the rear array. Furthermore, the infrared light emitting elements may be mounted in the front array, and the red, blue, and green light emitting elements may be mounted in the rear array. Moreover, the infrared, red, and green light emitting elements may be mounted in the front array, and the blue light emitting elements may be mounted in the rear array. In each of these layouts, the spectral characteristics of the dichroic mirror are set so that the surface closer to the light-emitting elements reflects light beams of the wavelengths of the light-emitting elements in the front array.

Also, the color layout in the two arrays and the spectral characteristics of the dichroic mirror may be determined in consideration of the amounts of light emitted by the respective LEDs. In general, in case of light transmission, some reflection losses are inevitable. Since light emitted by the element in the rear array is transmitted through the front mirror surface of the dichroic mirror twice, losses of the light are larger than that emitted by the element in the front array, which is reflected only once. The amount of light emitted by each LED chip differs depending on the colors, and in case of a negative film, the green or blue original density is high. In such case, larger amounts of green or blue light are required. Hence, preferably, the light emitting elements, the amount of light received by a line sensor 18 (to be described later) of which may be decreased, i.e., the amount of light received of which must be increased, are mounted in the front array, and those with sufficient light amounts are mounted in the rear array. Also, the LED chip with the smallest light emission amount is often preferably mounted in the front array.

Note that the attachment base 1 preferably consists of a metal since it can satisfactorily radiate heat generated by the chips. However, when the board 2 has high heat radiation characteristics, the base 1 may be formed of a plastic. In such case, a cost reduction can be attained.

Figure 5:
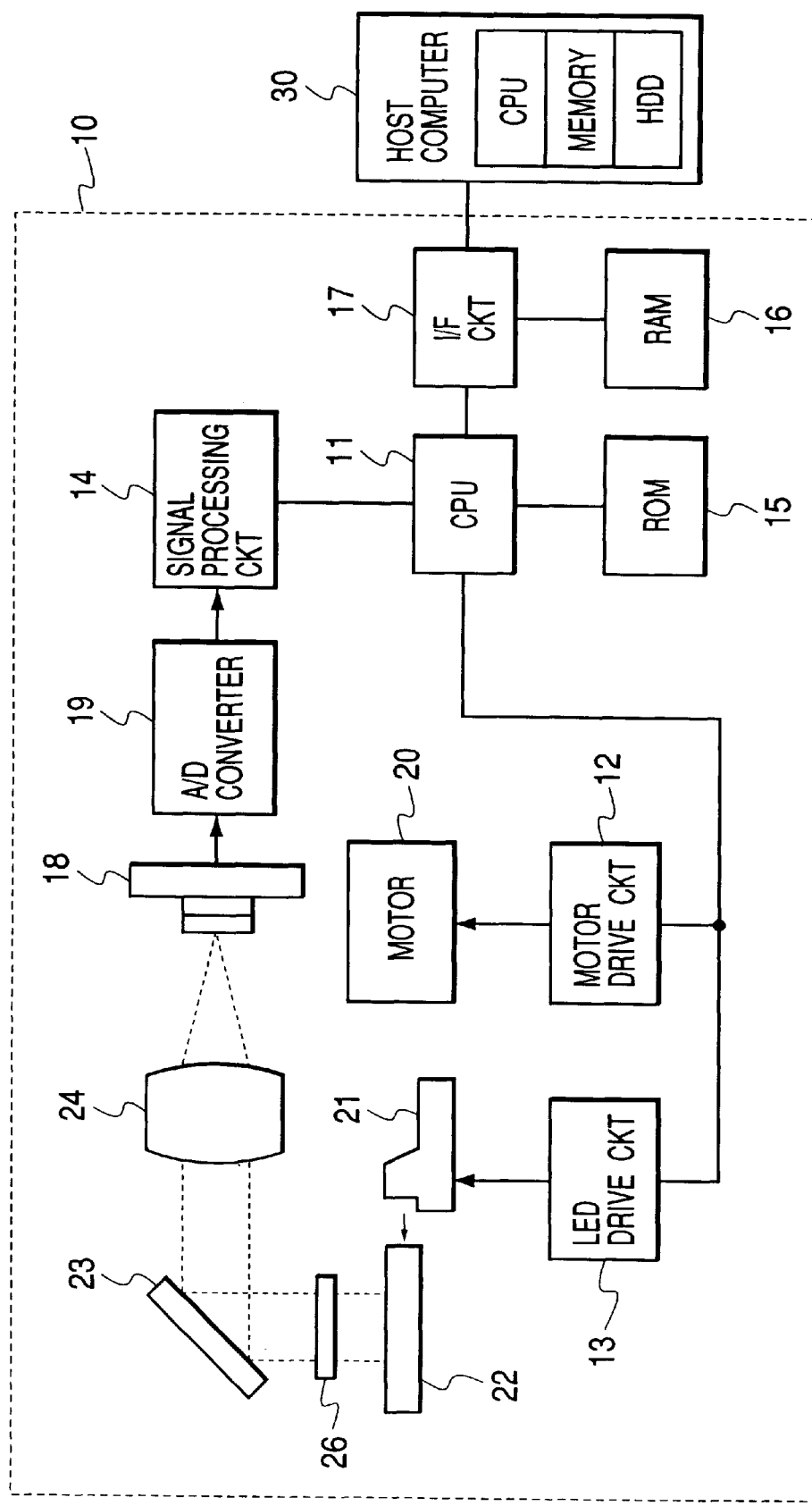
FIG. 5 is a diagram showing the arrangement of an image reading apparatus according to an embodiment of the present invention.

FIG. 5 shows the arrangement of an image reading apparatus according to the embodiment of the present invention. In FIG. 5, an image reading apparatus 10 comprises a central processing unit (to be referred to as a "CPU" hereinafter) 11, motor drive circuit 12, LED drive circuit 13, signal processing circuit 14, ROM 15, RAM 16, interface circuit (to be referred to as an "I/F" circuit hereinafter) 17, line sensor 18, A/D converter 19, motor 20, and illumination unit (illumination device 21 and optical member 22), which are connected to the CPU 11 via a bus, an optical system (deflecting mirror 23, lens 24, and the like), a convey path for a film original 26, and the like. The image reading apparatus 10 is connected to a host computer 30 via the I/F circuit 17.

The motor 20 performs operations for, e.g., setting and conveying the film original 26 at the reading position by driving roller pairs disposed along the convey path for the film original 26 under the control of the motor drive circuit 12, which operates in accordance with an instruction from the CPU 11. The film original 26 may be a negative film, reversal film, elongated film, or the like.

The illumination device 21 that builds the illumination unit has an arrangement shown in FIG. 1. In this case, since the optical member 22 is used, the need for the diffusion plate 4 is obviated. The illumination device 21 selectively emits light in four colors, i.e., red (R) light, green (G) light, blue (B) light, and infrared (IR) light under the control of the LED drive circuit 13 which operates in accordance with an instruction from the CPU 11, and outputs the light emitted toward one end face of the rod-like optical member 22. The arrangement of the optical member 22 is known to those who are skilled in the art (e.g., Japanese Laid-Open Patent Application No. 4-109755). The optical member 22 diffuses light rays entering from its one end face therein, and outputs, toward the film original 26, linear light rays from a slit-like light projection portion 22a formed on its side surface to extend in its longitudinal direction, as shown in FIGS. 6A to 6C.

The illumination unit comprises the illumination device 21 and optical member 22 (first embodiment: FIGS. 6A to 6C) in FIG. 5. The illumination unit may use a toric mirror in place of the optical member 22 (second embodiment: FIG. 7). These two embodiments will be explained below.

Figure 6A:
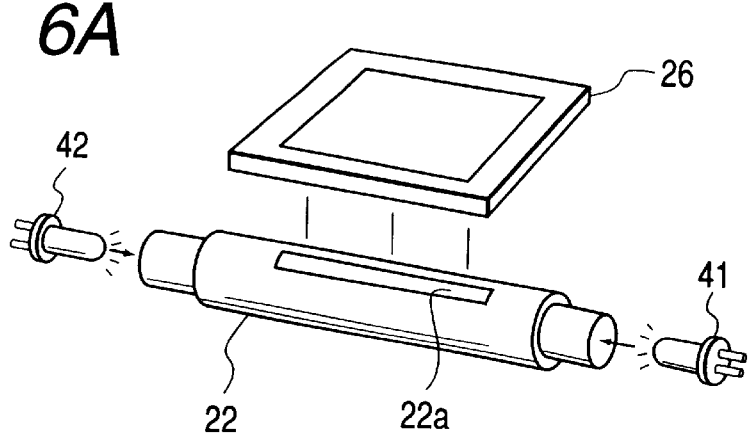
FIGS. 6A, 6B and 6C are perspective views showing examples of the arrangement of an illumination unit used in the first embodiment of the present invention.
Figure 6B:
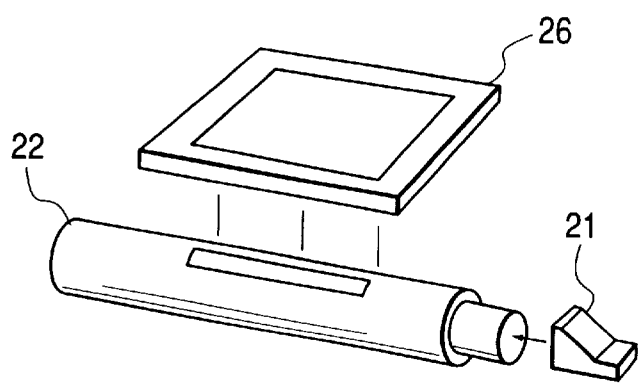
Figure 6C:
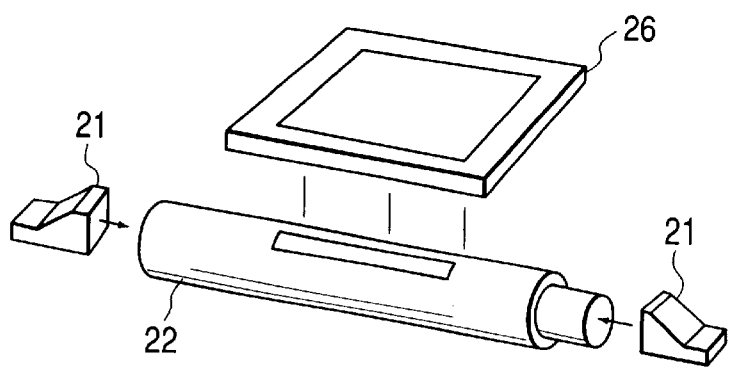
Figure 7:
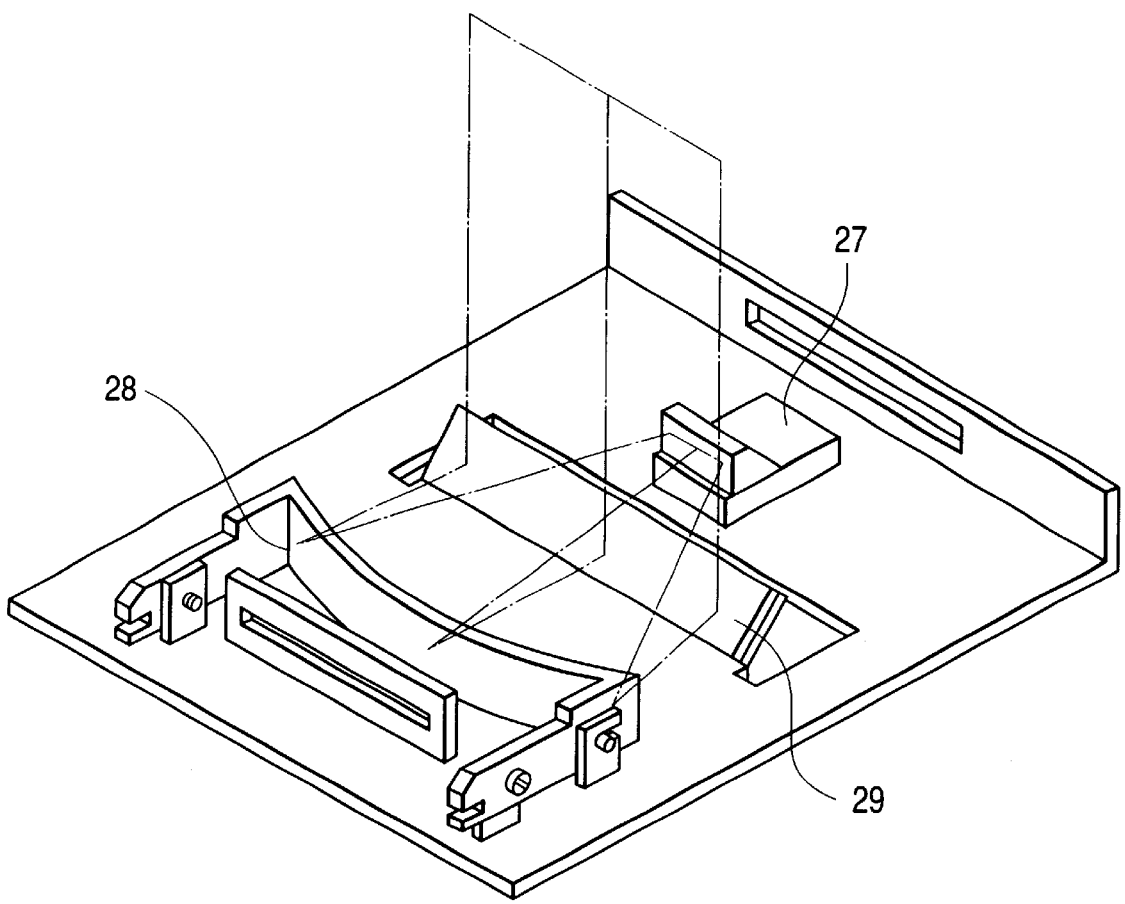
FIG. 7 is a perspective view showing an example of the arrangement of an illumination unit used in the second embodiment of the present invention.

FIGS. 6A to 6C show examples of the arrangement of the illumination unit of the first embodiment. As shown i n FIGS. 6A to 6C, the entire surface of the image storage area of the film original 26 is not illuminated by the illumination unit, but a band region with a given width is illuminated. The illumination unit shown in FIG. 5 has an arrangement shown in FIG. 6B. Alternatively, by utilizing the characteristics of the optical member 22, the illumination unit may have an arrangement shown in FIGS. 6A or 6C.

In FIG. 6A, a three-color light emitting lamp 41 is disposed at one end side of the optical member 22, and an infrared light emitting lamp 42 is disposed at the other end side. The three-color light emitting lamp 41 is obtained by integrally encapsulating red (R), green (G), and blue (B) LED chips, and is known to those who are skilled in the art as well as the infrared light emitting lamp. On the other hand, in FIG. 6C, the illumination devices 21 are disposed at the two ends of the optical member 22.

FIG. 7 shows the arrangement of the illumination unit of the second embodiment. The illumination unit of the second embodiment has substantially the same arrangement as that of the first embodiment, except for the optical member 22 shown in FIG. 5. In FIG. 7, an illumination device 27 has the same arrangement as that of the illumination device 21 in the illumination unit of the first embodiment. A toric mirror 28 focuses and reflects light coming from the illumination device 27 toward a return mirror 29. The return mirror 29 reflects light coming from the toric mirror 28 toward the film original 26. Of divergent light components output from the illumination device 27, only light components that become incident on the elongated toric mirror 28 are reflected toward the film original 26. Hence, the film original 26 is illuminated by linear light.

Referring back to FIG. 5, the optical system (return mirror 23, lens 24, and the like) guides light transmitted through the film original 26 to the line sensor 18 to form the image of the film original 26 thereon. The line sensor 18 outputs an electric signal (image signal) proportional to the amount of light received within an accumulation time which is set and controlled in advance. The output from the line sensor 18 is input to the signal processing circuit 14 via the A/D converter 19, and undergoes various kinds of correction, and the like. The processed data is input to the CPU 11 as image data (line data).

That is, the CPU 11 controls the motor drive circuit 12, LED drive circuit 13, and the like in accordance with a program set in the ROM 15, and captures image data of the film original 26 from the signal processing circuit 14. The CPU 11 arithmetically processes the captured image data, and temporarily stores the processed data in the RAM 16. The CPU 11 reads out the line data from the RAM 16 in accordance with a request from the host computer 30, and outputs it to the host computer 30 via the I/F circuit 17.

In this embodiment, upon arithmetic processing of the captured image data, the CPU 11 checks based on data read using infrared light if foreign matter or anomaly such as dust, scratch, and the like is present on the film original 26. If the CPU 11 detects foreign matter, it outputs an alarm signal, and corrects the data at the position of foreign matter using visible light data near that position.

The host computer 30 comprises a central processing unit (CPU), memory, hard disk drive (HDD), and the like. Also, the host computer 30 comprises an input device such as a keyboard, mouse, and the like, a display device, and the like (not shown).

The correction to be executed by the CPU 11 when dust, scratches, or the like are present on the film original 26 will be explained below with reference to FIG. 8. As is known, upon reading an image on the film original 26, a line interleaf scheme for reading while switching four colors in units of lines, and a plural pass color page sequence scheme for reading the entire frame for one color, then reading the frame for the next color, and repeating operations for four colors are available. With either of these schemes, the RAM 16 stores four color data, i.e., red (R), green (G), blue (B), and infrared (IR) data.

Note that the four color data have the following differences. That is, the red (R), green (G), and blue (B) data as visible light data respectively correspond to red (R), green (G), and blue (B) components of the film original 26. That is, the red (R), green (G), and blue (B) represent the density information of the film original 26. When dust, scratches, and the like are present on the film original 26, illumination light is intercepted or diffused by such foreign matter, and does not reach the line sensor 18. As a consequence, data of the portion where the dust, scratches, and the like are present indicate as if the corresponding portion of the film original 26 were darkest (have high density). Hence, the red (R), green (G), and blue (B) data obtained are a superposition of "information of light intercepted by dust, scratches, and the like" and "original density information of the film original".

On the other hand, since the film original 26 has no light-receiving sensitivity for infrared light (IR), no density differences are formed through the film original 26 with respect to infrared light (IR). Hence, when the illumination light is infrared light (IR), it is transmitted through the film original 26 with nearly no loss, and the obtained line data does not contain any information independently of film originals. However, if dust, scratches, and the like are present on the film original 26, since the illumination light is intercepted or diffused by such foreign matter, it does not reach the line sensor 18. That is, the line data obtained by the infrared (IR) light extracts only information of dust, scratches, and the like.

To summarize, when four color illumination light beams, i.e., red (R), green (G), blue (R), and infrared (IR) light beams are used, "information based on light intercepted by dust, scratches, and the like" is superposed on "original density information of the film original", which is also obtained by the conventional apparatus, in line data obtained by the red (R), green (G), and blue (R) illumination light beams. On the other hand, "information based on light intercepted by dust, scratches, and the like" is reflected in the line data obtained by the infrared (IR) illumination light.

Figure 8:
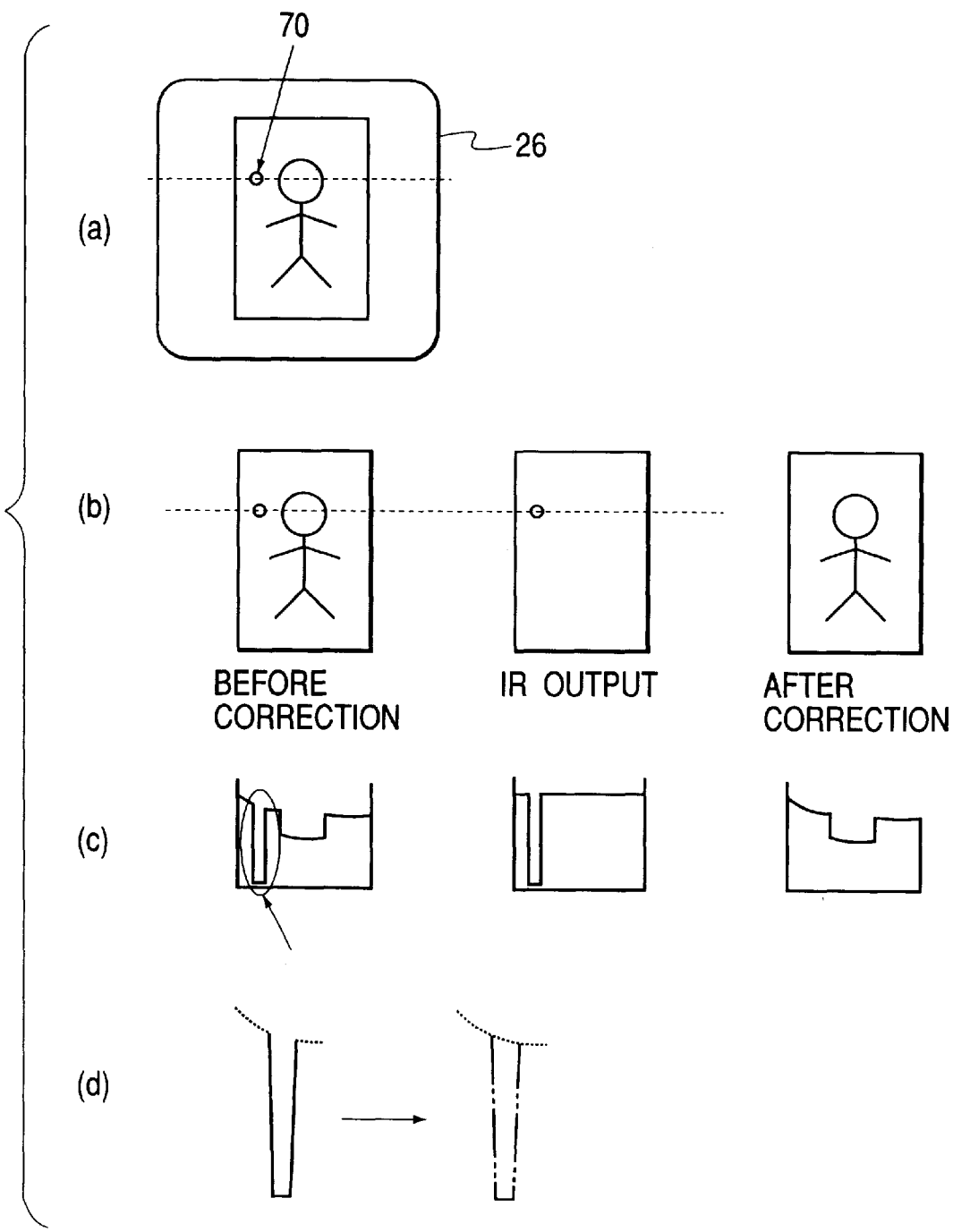
FIG. 8 is a diagram explaining image data correction processes.

Hence, when dust 70 is attached to the film original 26, as shown in row (a) of FIG. 8, frame data obtained by three color illumination light beams, i.e., red (R), green (G), and blue (B) light beams includes an image of the dust 70 in addition to a person image, as indicated by the left image of row (b) of FIG. 8. The corresponding line data includes data corresponding to the person image, and data corresponding to the attached portion of the dust 70, as indicated by the arrow in the left graph of row (c) of FIG. 8. On the other hand, frame data obtained based on infrared (IR) illumination light includes only the image of the dust 70, as indicated by the central image in row (b) of FIG. 8, and the corresponding line data includes only data corresponding to the portion where the dust 70 is attached, as indicated by the central graph in row (c) of FIG. 8.

In this way, the presence/absence of dust 70 can be determined based on line data obtained by infrared (IR) illumination light, and when the presence of dust 70 can be detected, the position of that dust 70 can be specified. Since data obtained from this specified position on the basis of red (R), green (G), and blue (B) illumination light beams also include information arising from the dust 70 (the portion indicated by the arrow in the left graph in row (c) of FIG. 8), the data obtained at the same position on the basis of red (R), green (G), and blue (B) illumination light beams can be corrected as if the dust 70 were not present (the right image in row (b) of FIG. 8, and the right graph in row (c) of FIG. 8). This correction can be attained by the following interpolation.

In general, since the area occupied by dust, scratches, or the like is not so large, it is unlikely to include any density difference (i.e., a pattern) on the film original 26 but is rather likely to include uniform density. Hence, as for the data portion where presence of dust, scratches, or the like is specified, data of neighboring portions are used and concatenated smoothly (see row (d) of FIG. 8), thus realizing correction that can produce a natural image with respect to the original image on the film original 26 (see the right image in row (b) of FIG. 8).

More specifically, if N represents the number of data in a portion lost due to dust, scratches, or the like, D1 represents the left neighboring data of the lost portion, and D2 represents the right neighboring data, then the i-th pixel data Di from the left neighboring data D1 is given by:

$$Di = D1 + i \times (D1-D1)/N \quad (4)$$

Hence, the lost data portion can be linearly interpolated. Note that the interpolation is not limited to linear interpolation but may use more complicated interpolation algorithms.

The CPU 11 performs the above-mentioned correction in units of red (R), green (G), and blue (B) line data, and outputs the corrected data to the host computer 30 as image data. The CPU 11 controls the convey unit to move the film original by one line and performs the correction until the predetermined number of lines is reached. With this processing, an image for one frame free from any dust, scratches, or the like can be obtained.

In this embodiment, data is interpolated in units of lines, and the corrected data is output to the host computer 30. Alternatively, the host computer 30 may perform image processing for frame data. In this case, the lost data portion may be interpolated two-dimensionally with reference to a plurality of line data before and after the line data of interest, in place of data for a given line. In such case, an image with higher quality may be obtained.

On the other hand, when the data portion that has probably been lost due to dust, scratches, and the like has a predetermined size or larger, the corrected image may become different from the original film image. In such case, an alarm message indicating that "dust, scratches, and the like are present on the film original" may be displayed for the user.

On the other hand, when the CPU 11 detects the presence of dust, scratches, and the like, it may display, on a warning display device which is connected to the CPU through a signal line, an alarm message indicating that "dust, scratches, and the like are present on the film original" or may turn on an alarm lamp in place of the above-mentioned correction, so as to inform the user of it.

In the above embodiment, the front LED array (shown in FIG. 4) comprises the infrared LEDs and the red LEDs while the rear LED array comprises the green LEDs and the blue LEDs, but this LED arrangement may reversed. Namely, the front LED array may comprise the green LEDs and the blue LEDs while the rear LEDs array may comprise the infrared LEDs and the red LEDs. In this case, the spectral characteristics of the front mirror surface of the dichroic mirror 3 should be set to totally reflect blue and green light beams and to transmit infrared and red light beams therethrough.

What is claimed is:

1. An illumination device comprising:
   a visible light emitting element for emitting visible light;
   an infrared light emitting element for emitting infrared light;
   a board including a first mounting portion on which a plurality of light emitting elements including at least said visible light emitting element are mounted in array and a second mounting portion on which a plurality of light emitting elements including at least said infrared light emitting element are mounted in array; and
   a dichroic mirror which is configured and disposed to reflect light emitted by said visible light emitting element mounted on said first mounting portion by a first surface thereof, reflect light emitted by said infrared light emitting element mounted on said second mounting portion by a second surface thereof, and send light beams coming from the first and second surfaces onto a common optical path.

2. A device according to claim 1, wherein the first surface transmits the infrared light therethrough.

3. A device according to claim 1, wherein the second surface transmits the visible light therethrough.

4. A device according to claim 1, wherein said visible light emitting element comprises at least one of a red light emitting element for emitting red light, a green light emitting element for emitting green light, and a blue light emitting element for emitting blue light.

5. A device according to claim 1, further comprising a diffusion plate disposed in the common optical path to diffuse the visible light.

6. A device according to claim 1, wherein the light emitting element mounted on the mounting portion closer to a light exit side of said first and second mounting portions is a light emitting element, an amount of light of which is required to be relatively larger.

7. A device according to claim 1, wherein said visible light emitting element comprises three different light emitting elements including a red light emitting element for emitting red light, a green light emitting element for emitting green light, and a blue light emitting element for emitting blue light, and the light emitting element mounted on one of the first and second mounting portions that is closer to a light exit side than the other includes said infrared and red light emitting elements, and the light emitting element mounted on the mounting portion farther from the light exit side includes said blue and green light emitting elements.

8. A device according to claim 1, wherein said visible light emitting element comprises three different light emitting elements including a red light emitting element for emitting red light, a green light emitting element for emitting green light, and a blue light emitting element for emitting blue light, and the light emitting element mounted on one of the first and second mounting portions that is closer to a light exit side than the other includes said infrared and blue light emitting elements, and the light emitting element mounted on the mounting portion farther from the light exit side includes said red and green light emitting elements.

9. A device according to claim 1, wherein said visible light emitting element comprises three different light emitting elements including a red light emitting element for emitting red light, a green light emitting element for emitting green light, and a blue light emitting element for emitting blue light, and the light emitting element mounted on one of the first and second mounting portions that is closer to a light exit side than the other includes said infrared light emitting element, and the light emitting element mounted on the mounting portion farther from the light exit side includes said red, blue, and green light emitting elements.

10. A device according to claim 1, wherein said visible light emitting element comprises three different light emitting elements including a red light emitting element for emitting red light, a green light emitting element for emitting green light, and a blue light emitting element for emitting blue light, and the light emitting element mounted on one of the first and second mounting portions that is closer to a light exit side than the other includes said infrared, red, and green light emitting elements, and the light emitting element mounted on the mounting portion farther from the light exit side includes said blue light emitting element.

11. A device according to claim 1, wherein said visible light emitting element comprises three different light emitting elements including a red light emitting element for emitting red light, a green light emitting element for emitting green light, and a blue light emitting element for emitting blue light, said infrared light emitting element is mounted at an inner position of the array on said first mounting portion, and said green light emitting element is mounted at an inner position of the array on said second mounting portion.

12. A device according to claim 1, wherein said visible light emitting element comprises three different light emitting elements including a red light emitting element for emitting red light, a green light emitting element for emitting green light, and a blue light emitting element for emitting blue light, said infrared light emitting element is mounted at an outer position of the array on said first mounting portion, and said green light emitting element is mounted at an outer position of the array on said second mounting portion.

13. A device according to claim 1, further comprising a rod-like optical member disposed in the common optical path to convert light entering from one end thereof into linear output light.

14. An image reading apparatus which comprises an illumination device for illuminating an original, a convey device for conveying the original, an image reading sensor for reading an image on the original upon receiving light transmitted through the original, and outputting an image signal, and an image processing device for arithmetically processing data of the image read by said image reading sensor, said illumination device comprising:

a visible light emitting element for emitting visible light;

an infrared light emitting element for emitting infrared light;

a board including a first mounting portion on which a plurality of light emitting elements including at least said visible light emitting element are mounted in array and a second mounting portion on which a plurality of light emitting elements including at least said infrared light emitting element are mounted in array;

a dichroic mirror which is configured and disposed to reflect light emitted by said visible light emitting element mounted on said first mounting portion by a first surface thereof, reflect light emitted by said infrared light emitting element mounted on said second mounting portion by a second surface thereof, and send light beams coming from the first and second surfaces onto a common optical path; and a diffusion plate disposed in the common optical path to diffuse light leaving said dichroic mirror.

15. An apparatus according to claim 14, wherein said image processing device comprises:

a detection device for detecting foreign matter present on the original from data read using the infrared light.

16. An apparatus according to claim 15, wherein said image processing device further comprises:

an alarm generation device for outputting an alarm signal upon detection of the presence of foreign matter on the original.

17. An apparatus according to claim 15, wherein said image processing device further comprises:

a correction device for, when the presence of foreign matter on the original is detected, correcting data at a position of foreign matter using visible light data near the position upon arithmetically processing data read using the visible light.

18. An image reading apparatus which comprises an illumination device for illuminating an original, a convey device for conveying the original, an image reading sensor for reading an image on the original upon receiving light transmitted through the original, and outputting an image signal, and an image processing device for arithmetically processing data of the image read by said image reading sensor, said illumination device comprising:

a visible light emitting element for emitting visible light;

an infrared light emitting element for emitting infrared light;

a board including a first mounting portion on which a plurality of light emitting elements including at least said visible light emitting element are mounted in array and a second mounting portion on which a plurality of light emitting elements including at least said infrared light emitting element are mounted in array;

a dichroic mirror which is configured and disposed to reflect light emitted by said visible light emitting element mounted on said first mounting portion by a first surface thereof, reflect light emitted by said infrared light emitting element mounted on said second mounting portion by a second surface thereof, and send light beams coming from the first and second surfaces onto a common optical path; and a rod-like optical member disposed in the common optical path to convert light reflected by said dichroic mirror and entering from one end thereof into linear output light.

19. An apparatus according to claim 18, wherein said image processing device comprises:

a detection device for detecting foreign matter present on the original from data read using the infrared light.

20. An apparatus according to claim 19, wherein said image processing device further comprises:

an alarm generation device for outputting an alarm signal upon detection of the presence of foreign matter on the original.

21. An apparatus according to claim 19, wherein said image processing device further comprises:

a correction device for, when the presence of foreign matter on the original is detected, correcting data at a position of foreign matter using visible light data near the position upon arithmetically processing data read using the visible light.

* * * * *